Oct. 3, 1944.                R. HOFFMAN                2,359,557
                           SAFETY TACKLE HOOK
                           Filed June 7, 1944
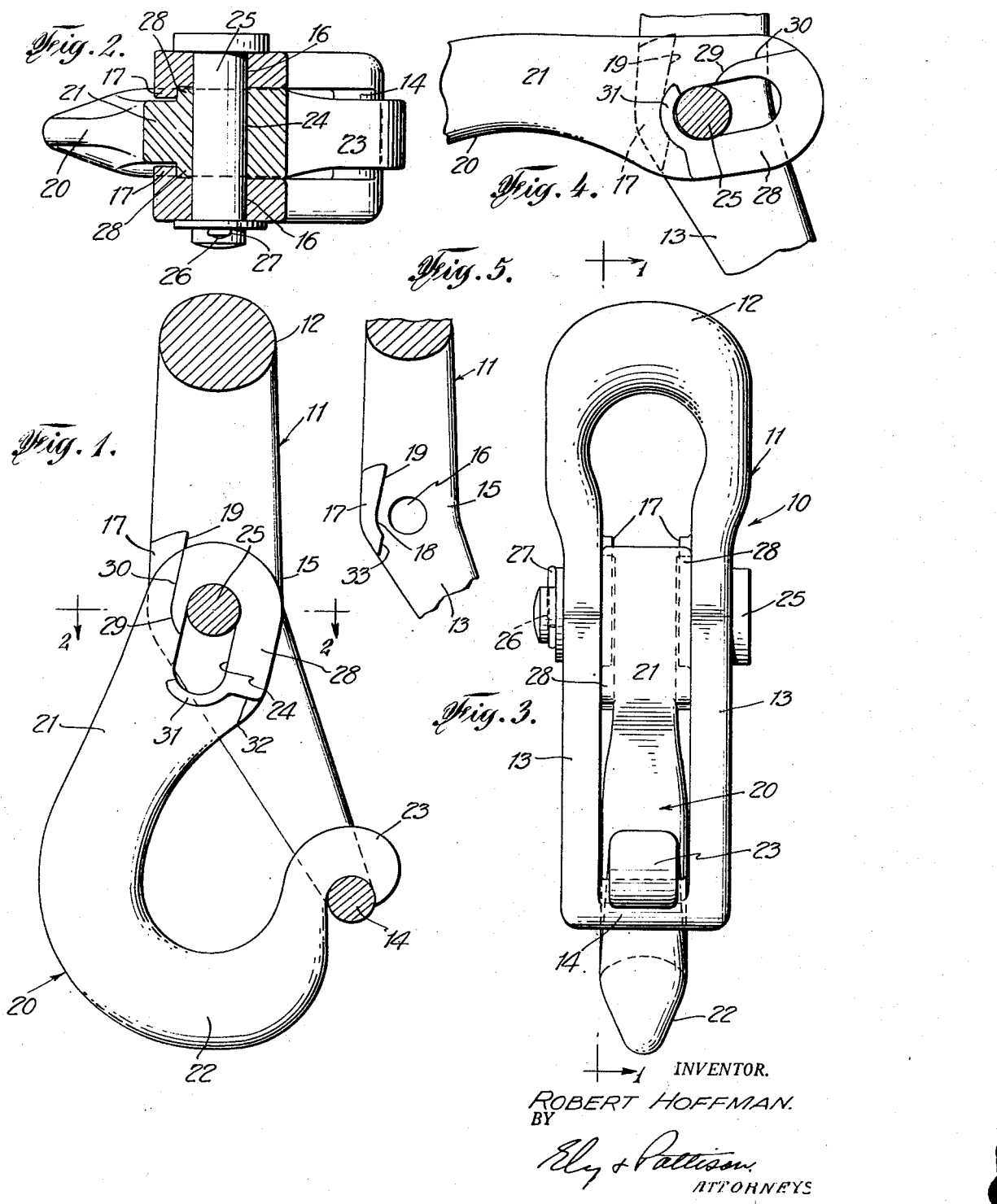
INVENTOR.
ROBERT HOFFMAN.
BY
Ely & Pattison
ATTORNEYS Patented Oct. 3, 1944

2,359,557

UNITED STATES PATENT OFFICE 2,359,557

SAFETY TACKLE HOOK

Robert Hoffman, Bronxville, N. Y.

Application June 7, 1944, Serial No. 539,212

7 Claims. (Cl. 294—83)

This invention relates to improvements in safety tackle hooks of the type used in the hoisting of heavy articles.

The primary object of the invention is to increase the safety factor of the tackle hook over those in general use and with which I am familiar.

Another object of the invention is to equalize the weight of the load upon the tackle hook by distributing the same between the hook and the clevis in which the hook is pivotally mounted.

A further object of the invention resides in a tackle hook in which the pivoted hook with its carrying load is prevented from pulling away from the clevis should the pivot of the hook become broken or accidentally drop out during use of the tackle hook.

Other novel features of the invention will become apparent as the following specification is read in conjunction with the accompanying drawing, in which, Figure 1 is a vertical sectional view of my improved safety tackle hook taken substantially on the line 1—1 of Figure 3.

Figure 2 is a horizontal sectional view on the line 2—2 of Figure 1.

Figure 3 is a front elevational view.

Figure 4 is a detail vertical sectional view illustrating the hook in open position.

Figure 5 is a fragmentary vertical sectional view through the clevis per se.

Referring to the drawing by reference characters, the numeral 10 designates my improved safety tackle hook in its entirety which includes a clevis 11 which is constructed of metal and formed by casting, whereby it is a single integral unit. The clevis 11 comprises an upper bail portion 12, spaced parallel depending arms 13—13, and a transverse bar 14 which is round in cross section and bridges the space between the lower ends of the arms. The arms 13—13 are widest just above their mid-portions as at 15 and from which point the lower ends of the arms extend at an angle from their upper portions and taper toward the bar 14, whereby the bar is offset with respect to a line drawn vertically through the upper portions of the arms. The arms 13—13 are provided at the wide portion 15 thereof with axially alined bolt holes 16—16. The arms 13—13 have like opposed integral flanges 17—17 extending inwardly therefrom and which are disposed at the rear or outer bend between the upper and lower angularly disposed portions of the arms. Each flange 17 includes a curved wall portion 18 concentric to the hole 16 and an upwardly extending straight portion 19.

The clevis 11 supports a hook 20 which, in side elevation, is of substantially inverted crook-shape. The hook 20 is formed of metal cast in a single piece and comprises a shank 21, a hook portion 22, and a downturned lip 23. The upper end of the shank 21 is provided with an elongated slot 24 of a width equal to the diameter of the holes 16 with which the slot alines and of a length sufficient to enable the hook 20 to be slid relative to the clevis 11 for a distance necessary to connect and disconnect the lip 23 with the bar 14. Both ends of the slot 24 are rounded on an arc whose radius is equal to that of the diameter of the pivot pin 25. The pin 25 passes through the alined holes 16—16 and slot 24, it being understood that the free upper end of the shank 21 of the hook 20 is disposed between the arms 13—13. The pin 25 has a shoulder at one end while the shank thereof is provided with an opening 26 for the reception of a cotter pin 27.

The opposed sides of the free end of the shank 21 of the hook 20 are thickened to provide like flanges 28—28 which surround the slots 24 with the exception of a small portion along the rear wall thereof. Each flange 28 includes a curved surface 29 and a straight surface 30, which surfaces are complementary to portions 18 and 19 respectively and against which they seat when the hook 20 is locked to the bar 14. The flange 28 extends along the front of the shank and terminates in a reduced semicircular shaped bearing portion 31 which seats against the curved portion 29 when the hook is disengaged from the bar 14 and swung to an open position. The hook is limited in its swinging movement to open position by the shoulders 32 of the flanges 28 abutting the lower shouldered ends 33 of the flanges 17.

In operation of the safety tackle hook 10, assume that the parts are in the position shown in Figure 3, wherein the lip 23 of the hook 20 is seated on the bar 14 and the upper end of the slot 24 is adjacent the pivot pin 25. The surfaces 29 and 30 of the hook 20 are in complementary abutting relation with the portions 18 and 19 respectively of the clevis 11. The entrance to the hook portion 22 of the hook is blocked by the lower ends of the arms 13—13, thus a bail, rope, or cable when engaged with the hook 20 is prevented from sliding or jumping off the same. The weight of an article supported by the hook 20 is distributed between the same and the clevis 11, namely, between the abutting flanges 17 and 28, and between the lip 23 and bar 14. The abutting flanges 17 and 28 relieve the pivot pin 25 of the strain of the weight usually imparted thereto in tackle hooks heretofore produced.

Assume that it is desired to actuate the hook 20 to open position. The operator may either slide the hook 20 up or the clevis 11 down relative to each other to cause the pivot pin 25 to assume a position at the other or lower end of the slot 24, at which position the surfaces 29 and 30 move away from the flange portions 18 and 19 respectively while the bearing flange portion 31 assumes a position complementary to the curved flange portion 18 whereupon the hook 20 is free to be swung rearwardly about the axis of the pivot pin to an open position clear of the lower end of the clevis. The reverse operation takes place when the hook 20 is actuated to a closed position. The hook 20 is swung downward about the axis of the pivot pin 25 until the bearing flanges 31 clear the shoulders 33, whereupon the hook may drop by gravity and the same guided to cause the lip 23 to again seat upon the bar 14.

When assembling the parts which form the tackle hook 10, the upper flange end of the hook 20 is inserted between the arms 13—13 of the clevis 11 at a point above the flanges 17, after which it is slid down to cause the flanges 17 and 28 to abut. The upper end of the slot 24 is now in alinement with the bolt holes 16—16, whereupon the pivot pin 25 may be inserted therethrough and the fastening nut 26 applied.

In the event that the pivot pin 25 should break or drop from its bearing holes when the hook 20 is in closed position, the abutting surfaces of the flanges 17 and 28 will function to prevent the hook from dropping away from the clevis. This is an important feature of my invention for it greatly increases the safety factor of my tackle hook over those others with which I am familiar.

While I have shown and described what I consider to be the preferred embodiment of my invention, I wish it to be understood that such changes in construction and design as come within the scope of the appended claims may be resorted to if desired without departing from the spirit of my invention.

Having thus described my invention, what I claim as new and desire to secure by Letters Patent of the United States is:

1. A safety tackle hook comprising a clevis having a transverse bar at its lower end, a fixed pivot mounted in said clevis, a hook having a shank portion at its upper end and a lip at its lower end, the shank portion having an elongated slot through which the pivot freely passes whereby the hook may be slid relative to the clevis to seat the lip on said bar to close said hook or disconnect the same therefrom for actuation to an open position, and abutting elements on the clevis and the shank portion of the hook for relieving the pivot of the weight of the hook and any load carried thereby when the hook is in closed position.

2. A safety tackle hook comprising a clevis having spaced side arms and a transverse bar bridging the space at the lower end of the arms, a pivot mounted in said arms, a hook having a shank portion at one end and an outwardly extending lip at its bill end, said shank portion having an elongated slot therein through which the pivot freely passes whereby said hook may be slid to a position relative to the clevis to seat the lip on said bar or to a position to cause the lip to clear said bar for subsequent swinging movement about the axis of the pivot to open position, and means operable upon swinging of the hook to open position for arresting sliding movement of the hook relative to the clevis.

3. A safety tackle hook comprising a clevis having spaced side arms and a transverse bar bridging the space at the lower end of the arms, a pivot mounted in said arms, a hook having a shank portion at one end and an outwardly extending lip at its bill end, said shank portion having an elongated slot therein through which the pivot freely passes whereby said hook may be slid to a position relative to the clevis to seat the lip on said bar or to a position to cause the lip to clear said bar for subsequent swinging movement about the axis of the pivot to open position, means operable when the lip of the hook is seated upon the bar for relieving the pivot of the weight of the hook and any load carried thereby, and means operable upon swinging of the hook to open position for arresting sliding movement of the hook relative to the clevis.

4. A safety tackle hook comprising a clevis having spaced side arms and a transverse bar bridging the space at the lower end of the arms, a pivot mounted in said arms, a hook having a shank portion at one end and an outwardly extending lip at its bill end, said shank portion having an elongated slot therein through which the pivot freely passes whereby said hook may be slid to a position relative to the clevis to seat the lip on said bar or to a position to cause the lip to clear said bar for subsequent swinging movement about the axis of the pivot to open position, and abutting flanges provided on said clevis and on the shank portion of said hook for arresting the sliding movement of the hook relative to the clevis during swinging movement of the hook to open position.

5. A safety tackle hook comprising a clevis having spaced side arms and a transverse bar bridging the space at the lower end of the arms, a pivot mounted in said arms, a hook having a shank portion at one end and an outwardly extending lip at its bill end, said shank portion having an elongated slot therein through which the pivot freely passes whereby said hook may be slid to a position relative to the clevis to seat the lip on said bar or to a position to cause the lip to clear said bar for subsequent swinging movement about the axis of the pivot to open position, and abutting flanges provided on said clevis and the shank portion of said hook when said lip is seated on said bar for relieving the pivot of the weight of the hook and any load carried thereby.

6. A safety tackle hook comprising a clevis having a transverse bar at the lower end thereof, a pivot mounted in said clevis, a hook having a shank portion at one end and a downturned lip at its other end, said shank portion having an elongated slot therein through which said pivot passes whereby the hook may be slid relative to the clevis to seat the lip thereof on said bar and disconnect the same therefrom, and safety means on said clevis and hook operable upon the accidental breaking or dislocation of the pivot for preventing the shank end of the hook from becoming separated from said clevis.

7. A safety tackle hook as set forth in claim 6 in which the safety means comprises flanges provided on said hook in the path of stop flanges provided on the clevis.

ROBERT HOFFMAN.